United States Patent
Ebi

(10) Patent No.: US 7,235,146 B2
(45) Date of Patent: Jun. 26, 2007

(54) METHOD FOR REPAIRING THE ELECTRIC INSULATION LAYERS BETWEEN PIECES OF SHEET METAL OF SHEET METAL SEGMENTS OF ELECTRIC GENERATORS AND MOTORS

(75) Inventor: Gunter Ebi, Hohentengen (DE)

(73) Assignee: Sensoplan Aktiengesellschaft, Hohentengen (DE)

( * ) Notice: Subject to any disclaimer, the term of this patent is extended or adjusted under 35 U.S.C. 154(b) by 115 days.

(21) Appl. No.: 10/908,082

(22) Filed: Apr. 27, 2005

(65) Prior Publication Data

US 2005/0241131 A1      Nov. 3, 2005

(30) Foreign Application Priority Data

Apr. 28, 2004  (DE) .................. 10 2004 020 725

(51) Int. Cl.
*B32B 43/00*   (2006.01)
*B32P 6/00*    (2006.01)

(52) U.S. Cl. .................. 156/94; 29/402.01; 29/402.03; 29/402.09

(58) Field of Classification Search ..................... None
See application file for complete search history.

(56) References Cited

U.S. PATENT DOCUMENTS 3,710,437 A  *  1/1973  Kipple et al. ................. 29/596
4,776,082 A     10/1988  Janzer ......................... 29/598
6,455,100 B1 *  9/2002  Heimann et al. ............ 427/104

FOREIGN PATENT DOCUMENTS

| EP | 0660336 | * | 6/1995 |
| GB | 2150145 | * | 6/1985 |
| JP | 11-234929 | * | 8/1999 |

* cited by examiner

*Primary Examiner*—Justin R. Fischer
(74) *Attorney, Agent, or Firm*—Gudrun E. Huckett

(57) ABSTRACT

In a method for repairing electric insulation layers between sheet metal pieces of sheet metal segments of electric generators or motors, wherein between two neighboring sheet metal pieces an electric insulation is arranged, two neighboring sheet metal pieces are spread apart by introducing a tool for generating a permanent channel-shaped intermediate space between the two neighboring sheet metal pieces. Into the intermediate space, a curable, electrically insulating insulation material as an electric insulator is forced.

20 Claims, 1 Drawing Sheet

METHOD FOR REPAIRING THE ELECTRIC INSULATION LAYERS BETWEEN PIECES OF SHEET METAL OF SHEET METAL SEGMENTS OF ELECTRIC GENERATORS AND MOTORS

BACKGROUND OF THE INVENTION

The invention relates to a method for repairing the electric insulation layers between the sheet metal pieces of sheet metal segments of electric generators and motors, wherein between two neighboring sheet metal pieces an electric insulator is arranged, respectively.

The present invention is designed for electric generators as well as electric motors for industrial applications. Such electric generators as well as electric motors are comprised of sheet metal segments of stacked sheet metal pieces. Thin electric insulation layers are arranged between the individual pairs of sheet metal pieces. The problem of these electric generators and motors resides in that, for example, as a result of aging or vibrations, loosening can occur, in particular, loosening of the windings within the sheet metal segment, on the one hand, and loosening of the sheet metal pieces, on the other hand. The result of loosening of the sheet metal pieces is that the interposed insulation layers are subjected to wear. Because of this, short circuits can result which lead to heat generation and can cause core burning in extreme situations.

The repair of worn electric insulation layers between the sheet metal pieces of sheet metal segments of electric generators has been performed in the past in that by means of a so-called beveled-edge chisel the intermediate space between two sheet metal pieces is widened. Subsequently, a mica platelet is inserted into the intermediate space. Mica is an electric insulation body. The inserted mica platelet repairs the defective insulation between the two neighboring sheet metal pieces. Alternatively, coatings of insulation varnish or resin are applied by means of a brush or by drip impregnation.

The disadvantage of these known repair techniques resides in that the new insulation does not penetrate deeply into the sheet metal segment so that defects of the insulation layers that are positioned deep within the sheet metal segment cannot be repaired.

SUMMARY OF THE INVENTION

It is an object of the present invention to increase the repair depth for a method of the aforementioned kind for repairing electric insulation layers between the sheet metal pieces of sheet metal segments of electric generators repair depth.

In accordance with the present invention, this is achieved in that neighboring sheet metal pieces are spread apart by introducing a tool such that a permanent channel-shaped intermediate space is generated between the two neighboring sheet metal pieces; and in that a curable, electrically insulating insulation compound is pressed or forced as an electric insulator into the intermediate space.

The basic principle of the repair method according to the invention resides in that the neighboring sheet metal pieces are spread apart and, in this way, a channel-shaped intermediate space between the two sheet metal pieces is generated. Spreading of the sheet metal pieces is carried out in the accessible bore area of the sheet metal segment. The magnitude of spreading is smaller than the thickness of the sheet metal pieces. After having permanently spread apart the sheet metal pieces, a viscous, electrically insulating insulation material or compound is pressed into the intermediate spaces. The insulation material or compound can be varnish or a resin that will cure or harden after a certain period of time. The special effect when pressing or forcing the insulation compound into the intermediate spaces resides in that the insulation compound will continue to be transported as a result of capillary action and, for example, can reach two to three times the depth of an inserted electric insulation body. In this connection, an average with regard to the pressing force of the insulation material must be found. When the pressure is too great, there is the risk that the insulation compound will ooze laterally out of the sheet metal segment. When the pressure is too small, the penetration depth is reduced. The penetration depth itself depends also on the height of the channel-shaped intermediate space. The advantage of the repair method according to the invention resides in that by means of the increased penetration depth of the insulation compound also areas within the sheet metal segment can be provided with insulation material which in the past were impossible to repair.

It is possible to spread the sheet metal pieces sequentially by means of a so-called beveled-edge chisel in order to provide the intermediate spaces but this is a rather rough method because it can lead to massive damages and because the intermediate spaces that are produced are in general larger than needed. In accordance with a further embodiment of the invention, it is therefore proposed that, prior to forcing the insulation compound into the intermediate space, an insulation material in the form of a solid electric insulation body is inserted that keeps the sheet metal pieces precisely at the desired spacing or distance. The inserted electric insulating member serves only as a spacer or wedge. Customarily, the thickness of the inserted electric insulation body is within a range of 0.01 to 0.1 mm.

Preferably, the electric insulation body is a mica platelet. Mica is characterized, on the one hand, by its electric insulation properties and, on the other hand, by ease of handling.

According to a preferred embodiment, on either side of the channel-shaped intermediate space an electric insulation body is provided, respectively. The two electric insulation bodies delimit thus on opposed sides the intermediate space between adjacently positioned (neighboring) sheet metal pieces and defines thus the channel.

It is preferred according to another embodiment that the electric insulation body is strip-shaped and, according to a further embodiment, the strips taper toward the leading end in the direction of insertion. In this way, the platelets can be inserted in a simple way into the sheet metal segment.

According to another embodiment of the invention, the electric insulation body is coated with a curable adhesive material before being inserted. This curable adhesive material can be an epoxy resin that is thinly applied onto both sides of the electric insulation body over the entire surface area.

The adhesive material according to a preferred embodiment of the invention is preferably the same insulation material that is subsequently pressed or forced into the intermediate space.

In order to accelerate the curing action, it is proposed according to a preferred embodiment of the invention to heat the insulation material and/or the adhesive material for the purpose of curing.

For cleaning the channel-shaped intermediate spaces, according to one embodiment of the invention it is proposed that the intermediate spaces are rinsed with a cleaning medium, in particular, alcohol. Drying can be carried out by means of compressed air.

Subsequently, according to another embodiment of the invention, the insulation material is pressed or forced into the intermediate space in that, as a basic principle, a type of injection head is provided that is pressed against the end face of the sheet metal segment and is secured or fixed thereat in an appropriate way. In this way, the required seal-tightness between the injection head and the sheet metal segment is provided. Subsequently, the insulation material can be pressed or forced by means of the injection head into the intermediate spaces. The same injection head can also be used for cleaning the intermediate spaces with alcohol.

BRIEF DESCRIPTION OF THE DRAWING

One embodiment of the method according to the invention for repairing electric insulation layers between the sheet metal pieces of sheet metal segments of electric generators and motors will be explained in the following with the aid of the accompanying drawings.

DESCRIPTION OF THE PREFERRED EMBODIMENTS

Figure 1:
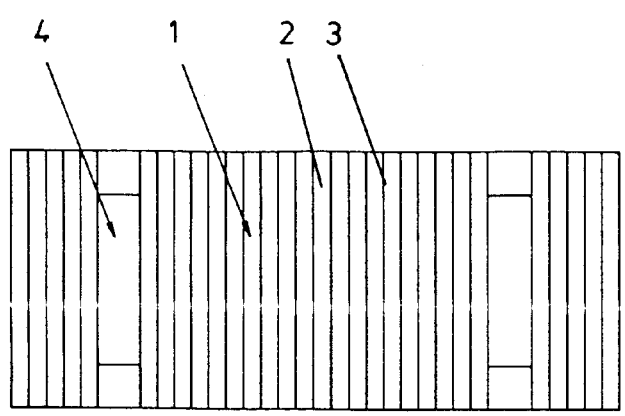
FIG. 1 is a view of several sheet metal segments with intermediate cooling channels.

FIG. 1 shows three sheet metal segments 1 of an electric generator (the two outer sheet metal segments 1 are shown only partially). These sheet metal segments 1 are comprised of a stack of sheet metal pieces 2 between which the electric insulation layers 3 are located.

Between the sheet metal segments 1 there are cooling channels 4.

In order to repair the electric insulation layers 3 between the sheet metal pieces 2 of the sheet metal segments 1, the following method is employed.

Figure 2:
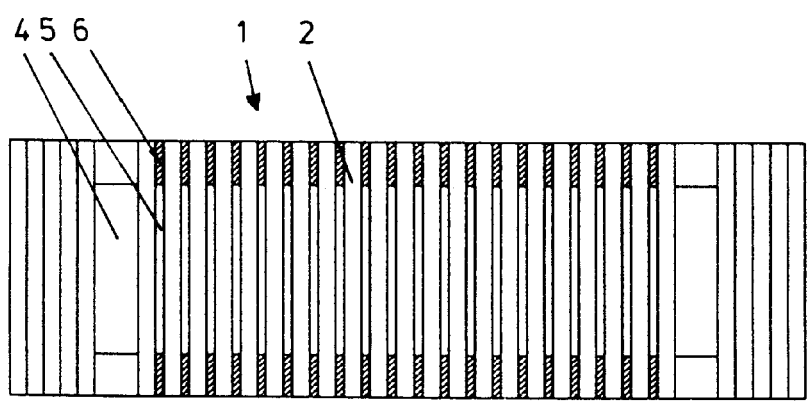
FIG. 2 is an illustrations in accordance with FIG. 1 after the sheet metal pieces have been spread apart.
Figure 3:
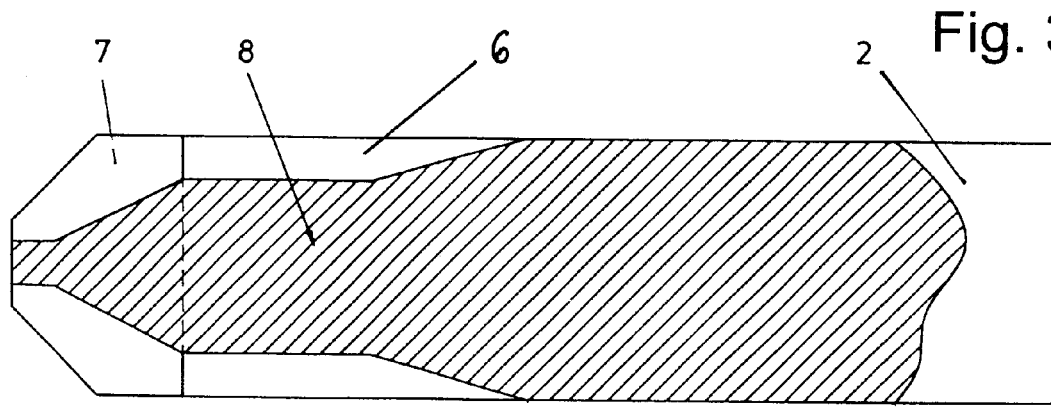
FIG. 3 is a longitudinal section of the sheet metal segment after having pressed the insulation varnish into the intermediate spaces.

First, two neighboring sheet metal pieces 2 are spread apart by inserting a so-called beveled-edge chisel so that an intermediate space 5 between the two adjacent or neighboring sheet metal pieces 2 is provided. An electric insulation body 6 in the form of a mica platelet is inserted into this intermediate space 5 in the edge area of the sheet metal segment 1, respectively, and acts between the two sheet metal pieces 2 as a spacer or wedge. After insertion of the electric insulation bodies 6, the chisel is removed. As illustrated in FIG. 3, the electric insulation bodies 6 are strip-shaped and taper toward the front end at an acute angle. FIG. 2 shows that in the sheet metal segments 1 all of the sheet metal pieces 2 are spread apart by the electric insulation bodies 6.

Subsequently, an injection head 7 is pressed against the end face of the sheet metal segments 1 and is secured thereat by fixation means that are not illustrated. The injection head 7 rests tightly against the sheet metal segment 1.

After completion of a possible rinsing step with alcohol for cleaning the intermediate spaces 5, the electric insulation material 8 in the form of a varnish or epoxy resin is pressed by means of the injection head 7 into the intermediate spaces 5 that are covered by the injection head 7. Because of capillary action, the electric insulation material 8 flows farther as is illustrated in FIG. 3. After removal of the injection head 7, insulation material 8 can be applied by means of a brush onto the end face of the sheet metal segment 1; the applied insulation material also penetrates as a result of capillary action into the intermediate spaces 5.

Subsequently, the insulation material 8 cures or sets so that a secure bond is provided within the sheet metal segment 1. Hardening or curing of the insulation material 8 can be accelerated by heating.

While specific embodiments of the invention have been shown and described in detail to illustrate the inventive principles, it will be understood that the invention may be embodied otherwise without departing from such principles.

What is claimed is:

1. A method for repairing electric insulation layers between sheet metal pieces of sheet metal segments of electric generators or electric motors, wherein between two neighboring sheet metal pieces an electric insulation is arranged, the method comprising the steps of:
   a) spreading apart two neighboring sheet metal pieces by introducing a tool for generating a permanent channel-shaped intermediate space between the two neighboring sheet metal pieces;
   b) inserting at least one electric insulation body into the intermediate space for spacing apart the two sheet metal pieces and subsequently forcing into the intermediate space a curable, electrically insulating insulation material as an electric insulator.

2. The method according to claim 1, wherein the at least one electric insulation body is a mica platelet.

3. The method according to claim 1, wherein two of the at least one electric insulation body are inserted on opposed sides of the channel-shaped intermediate space, respectively.

4. The method according to claim 1, wherein the at least one electric insulation body is strip-shaped.

5. The method according to claim 4, wherein the at least one electric insulation body has a tapering leading end in a direction of insertion.

6. The method according to claim 1, further comprising the step of coating the at least one electric insulation body with a curable adhesive material before the step of inserting.

7. The method according to claim 6, wherein the adhesive material is the curable, electrically insulating insulation material.

8. The method according to claim 6, wherein the adhesive material is heated to effect curing.

9. The method according to claim 1, wherein the curable, electrically insulating insulation material is heated to effect curing.

10. The method according to claim 1, further comprising, before the step b), the step of rinsing the channel-shaped intermediate spaces with a rinsing medium.

11. The method according to claim 10, wherein the rinsing medium is alcohol.

12. A method for repairing electric insulation layers between sheet metal pieces of sheet metal segments of electric generators or electric motors, wherein between two neighboring sheet metal pieces an electric insulation is arranged, the method comprising the steps of:
   a) spreading apart two neighboring sheet metal pieces by introducing a tool for generating a permanent channel-shaped intermediate space between the two neighboring sheet metal pieces; and b) forcing into the intermediate space a curable, electrically insulating insulation material as an electric insulator;

wherein in the step of b) an injection head is used that is secured tightly against an end face of the sheet metal segment and covers several of the intermediate spaces of the sheet metal segment.

13. The method according to claim 12, further comprising, before the step b), the step of rinsing the channel-shaped intermediate spaces with a rinsing medium.

14. The method according to claim 12, further comprising, before the step b), the step of inserting at least one electric insulation body into the intermediate space for spacing apart the two sheet metal pieces.

15. The method according to claim 14, wherein the at least one electric insulation body is a mica platelet.

16. The method according to claim 14, wherein two of the at least one electric insulation body are inserted on opposed sides of the channel-shaped intermediate space, respectively.

17. The method according to claim 14, wherein the at least one electric insulation body is strip-shaped.

18. The method according to claim 17, wherein the at least one electric insulation body has a tapering leading end in a direction of insertion.

19. The method according to claim 14, further comprising the step of coating the at least one electric insulation body with a curable adhesive material before the step of inserting.

20. The method according to claim 19, wherein the adhesive material is the curable, electrically insulating insulation material.

* * * * *